UNITED STATES PATENT OFFICE 2,623,050

CARBOXYLIC ACID-SULFONIC ACID MONO-HALIDES, NEW ACYLATING AGENTS, AND PROCESS FOR THE MANUFACTURE THEREOF

Charles Graenacher, Riehen, and Adolf Emil Siegrist and Heinrich Bruengger, Basel, Switzerland, assignors to Ciba Limited, Basel, Switzerland, a Swiss firm No Drawing. Application July 13, 1950, Serial No. 173,674. In Switzerland July 22, 1949

7 Claims. (Cl. 260—345)

This invention is based on the observation that the mono-halides or acids of the formula

in which A represents a 5-membered heterocyclic ring consisting of 4 carbon atoms bound together by conjugate double bonds and one sulfur atom or advantageously one oxygen atom, are valuable new compounds.

The mono-halides of the formula

in which A has the meaning given above, can be made, for example, by reacting a carboxylic acid of the formula

with chlorosulfonic acid. This reaction is advantageously carried out by introducing the appropriate carboxylic acid at room temperature into an excess of chlorosulfonic acid, and then allowing the mixture to react for a short time at a higher temperature, for example, at about 100° C., cooling the whole and pouring it on to ice, taking up the resulting sulfonic acid chloride in an organic solvent, for example, ether, dehydrating the resulting solution, and finally distilling off the solvent.

Especially valuable are monohalides of the formula

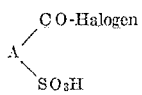

These can be obtained, for example, by sulfonating a carboxylic acid halide of the formula

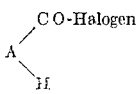

The sulfonation can be conducted, for example, at a low temperature by means of sulfur trioxide in liquid sulfur dioxide or with especial advantage in methylene chloride ($CH_2Cl_2$).

By the methods above described there can be obtained, for example, from furane- or thiophene-2-carboxylic acid, furane- or thiophene-2-carboxylic acid-5-sulfonic acid chloride and furane- or thiophene-2-carboxylic acid chloride-5-sulfonic acid.

The mono-halides of the acids of the formula first given above are valuable new acylating agents, and can be used as intermediate products for the manufacture of dyestuffs.

The invention is also based on the observation that in using these mono-halides as acylating agents it is especially advantageous to use them, not by themselves, but in admixture with an excess of a tertiary base.

These acylating agents containing bases may be prepared, for example, by incorporating with the aforesaid mono-halides a quantity of the tertiary base in excess of that theoretically required, for example, by introducing a halide of the formula

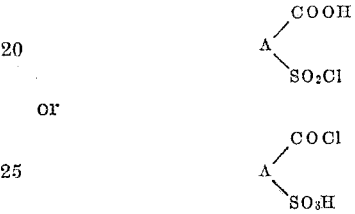

or into pyridine while cooling.

However, an especially advantageous method for making these acylating agents is to treat an acid of the formula

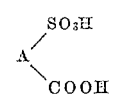

in which A represents a 5-membered heterocyclic ring consisting of 4 carbon atoms bound together by conjugate double bonds and one oxygen atom or sulfur atom, in the presence of an excess of a tertiary base with an aromatic sulfonic acid halide or advantageously with phosgene.

As acids of the above formula there come into consideration for use in the present process thiophene-carboxylic acid-sulfonic acids and especially furane-carboxylic acid-sulfonic acids. These acids may, if desired, contain further substituents such, for example, as alkyl groups, especially methyl groups, or advantageously halogen atoms such as bromine and especially chlorine. As examples of such acids there may be mentioned: 5-chloro-furane-2-carboxylic acid-3-sulfonic acid, 5-bromo-furane-2-carboxylic acid-3-sulfonic acid, 3:4-dichlorofurane-2-carboxylic acid-5-sulfonic acid, and furane-2-carboxylic acid-3-sulfonic acid. Especially valuable acylating agents are obtained by the present process from acids of the formula

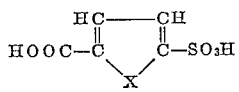

in which X represents an oxygen atom or sulfur atom, that is to say, from thiophene-2-carboxylic acid-5-sulfonic acid and advantageously from furane-2-carboxylic acid-5-sulfonic acid. These acids can be obtained, for example, by reacting thiophene-2-carboxylic acid or furane-2-carboxylic acid with sulfur trioxide in liquid sulfur dioxide or advantageously in methylene chloride or ethylene chloride at a low temperature. After removing the solvent the said acids are obtained in this manner in a dry form free from water of crystallization, which is especially suitable for the present process.

As aromatic sulfonic acid halides there are used with advantage in the present process easily accessible compounds of simple constitution, for example, acid bromides or advantageously acid chlorides of sulfonic acids of the benzene series such, for example, as benzene sulfonic acid chloride or para-toluene-sulfonic acid chloride or bromide.

The present process for making acylating agents is carried out in the presence of a tertiary base. For this purpose there may be used as bases, for example, trimethylamine, triethylamine, N-methyl-morpholine or advantageously pyridine. The tertiary base must be present in excess, that is to say, there must be present a larger quantity of the base than is required for saturating all the acid groups present in the reaction mixture. The tertiary bases in the acylating agents obtainable by the present process need not serve only as acid-binding agents but also as solvents for the substances to be acylated.

An advantageous form of the process consists in introducing the furane- or thiophene-carboxylic acid-sulfonic acid into the tertiary base, and then slowly adding at a somewhat raised temperature, for example, at 30–40° C., the acid halide (for example, para-toluene sulfonic acid chloride), or introducing gaseous phosgene.

An especially valuable acylating agent is obtained by adding to a mixture obtained in the manner described above with the use of pyridine as tertiary base, a tertiary base stronger than pyridine, for example, trimethylamine or advantageously triethylamine. Thus, for example, furane-carboxylic acid-sulfonic acids may be mixed with pyridine, then the aromatic sulfonic acid halide is added or phosgene introduced, and finally triethylamine is added.

When working in the absence of pyridine and in the presence of trimethylamine or triethylamine, it is generally of advantage in order to obtain a smooth reaction to add an inert organic solvent such as benzene, chlorobenzene, orthodichlorobenzene, 1:2:4-trichlorobenzene, nitrobenzene, dioxane or the like. Thus, for example, the furane- or thiophene-carboxylic acid-sulfonic acid and one of the aforesaid inert solvents may be brought together, and triethylamine may be added and the acid halide added or the phosgene introduced.

Instead of starting from the free furane- or thiophene-carboxylic acid-sulfonic acids it is possible in the present process for making acylating agents to start from a mono- or di-alkali salt of one of these compounds.

It follows from the foregoing description that the acylating agents contain a monohalide of an acid of the formula

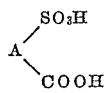

in which A represents a 5-membered heterocyclic ring consisting of 4 carbon atoms bound together by conjugate double bonds and one oxygen atom or sulfur atom, and also contain an excess of a tertiary base. When these acylating agents are obtained by mixing the carboxylic acid halide-sulfonic acid with a tertiary base or by the action of an aryl sulfonic acid halide or phosgene on the carboxylic acid-sulfonic acid, it will be easily understood that in the acid halide present in the mixture only the —COOH group is converted into a —CO-halogen group, for example into a —CO—Cl group, whereas the —SO₃H group also capable of forming an acid halide is not converted into a —SO₂-halogen group. However, even when the acylation is carried out with an acylating agent obtainable by mixing an acid halide of the constitution

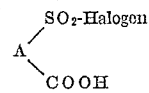

with a tertiary base there are obtained as a rule acyl-derivatives of the constitution

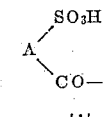

and not those of the constitution

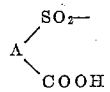

These new acylating agents can be used for acylating a very wide variety of compounds containing —NH-groups or —OH groups. Acylation with these agents generally takes place very easily. It is especially important that the acylation generally proceeds very well with the new acylating agents even in cases where acylation can otherwise be carried out only with difficulty, as is the case for example, in the introduction of a second acyl group into a mono-acylamino group (—NH—CO—R).

These acylating agents are especially valuable for acylating azo dyestuffs which are free from groups imparting solubility and contain the atomic grouping

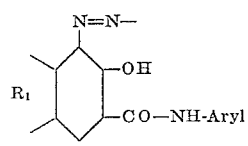

in which R₁ represents a cyclic radical condensed on to the benzene nucleus at the positions indicated by valence bonds.

By diacylating these azo dyestuffs with acylating agents obtainable by the present process, that is to say, by reacting one molecular proportion of the dyestuff with a quantity of the acylating agent containing at least two molecular proportions of an acid halide of the above kind, there are obtained acyl derivatives which, according to the present knowledge, contain the atomic group

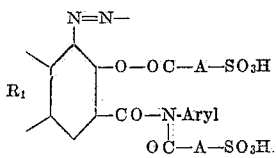

in which $R_1$ represents a cyclic radical condensed on to the benzene nucleus at the positions indicated by the valence bonds, and A represents a 5-membered heterocyclic ring consisting of 4 carbon atoms bound together by conjugate double bonds and one oxygen atom or sulfur atom. Even when the acylation is conducted with acylating agents containing a mono-halide of the constitution

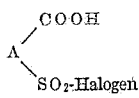

there are obtained acyl derivatives of the above formula in this connection [see also Ruggli, Helvetica Chimica Acta, vol. 24, page 197 (1941)].

Acylation by means of an acylating agent obtainable by the present process, for example, the diacylation of the above mentioned azo dyestuffs, can be carried out in a very simple manner. Thus, the dyestuff may be simply introduced into the acylating agent and the reaction completed by gentle heating, for example, to about 60–100° C.

However, the substance to be acylated may be mixed, prior to the production of the acylating agent, with one of the starting materials necessary for producing the acylating agent, for example, with the pyridine or the inert organic solvent. The production of the acylating agent by the present process and the acylation then follow. These two reactions may occur in succession or side by side.

Thus, for example, a dyestuff of the above constitution and the furane- or thiophene-carboxylic acid-sulfonic acid may be mixed in either order of succession with the tertiary base (for example, pyridine), the aromatic sulfonic acid halide, (for example para-toluene sulfonic acid chloride) added or the phosgene introduced, and, if desired a further tertiary base such as trimethylamine or triethylamine is added, and the reaction of the resulting halide of the furane- or thiophene-carboxylic acid-sulfonic acid with the dyestuff is brought about by heating. Alternatively, the furane- or thiophene-carboxylic acid-sulfonic acid may be mixed with an inert organic solvent, a suitable tertiary base (advantageously triethylamine) and the dyestuff, and the aromatic sulfonic acid halide or the phosgene is then introduced into the mixture.

After acylating dyestuffs of the above constitution, the reaction mixture may be worked up, for example, by pouring the whole, after cooling, into a dilute mineral acid, for example, sulfuric acid, precipitating the dyestuff from the acid solution by the addition of sodium chloride, and separating the dyestuff, and if desired purifying it by dissolution in water and reprecipitation with sodium chloride. When the reaction mixture contains an organic solvent which is insoluble or sparingly soluble in water, the solvent can be removed, for example, by distillation, if desired under reduced pressure, after pouring the mixture into a dilute mineral acid and the addition of sodium chloride.

The following examples illustrate the invention, the parts and percentages being by weight unless otherwise stated and the relationship of parts by weight to parts by volume being the same as that of the kilogram to the litre:

*Example 1*

26 parts of furane-2-carboxylic acid chloride are dissolved in 26 parts of methylene chloride, while stirring in a flask fitted with a stirring mechanism, and the solution is then cooled to −10° C. A solution of 16.5 parts of sulfur trioxide in 24 parts of methylene chloride is then introduced dropwise, while stirring, in the course of 20 minutes, the temperature being maintained at −10° C. Then the mixture is stirred for a further 30 minutes, and the temperature in the flask is allowed to rise to 0° C. The methylene chloride is distilled at room temperature from the brown reaction product, and the latter is dried in vacuo at room temperature overnight. Furane-2-carboxylic acid chloride-5-sulfonic acid is obtained in the form of a brown viscous product.

By introducing 7.3 parts of the latter product into 30 parts by volume of dry pyridine a valuable acylating agent is obtained.

*Example 2*

20 parts of furane-2-carboxylic acid are introduced at room temperature, while stirring, into 80 parts of chlorosulfonic acid. The whole is then heated to 100° C. in the course of 30 minutes, and maintained at this temperature for 2 hours. After cooling, the whole is poured onto 300 parts of ice, extracted with 100 parts of ether, the ethereal solution is dehydrated with anhydrous sodium sulfate, and the ether is distilled off leaving behind furane-2-carboxylic acid-5-sulfonic acid chloride. The latter sulfonic acid chloride remains behind as a dark viscous oil which completely solidifies after a short time to a solid crystalline mass.

*Example 3*

3.65 parts of furane-2-carboxylic acid-5-sulfonic acid are dissolved in 40 parts by volume of dry pyridine, while stirring, and 4 parts of para-toluene-sulfochloride are added. When the para-toluene-sulfochloride has dissolved, 1.8 parts of the azo dyestuff from diazotized 1-aminonaphthalene and (2'-hydroxy-3'-naphthoylamino)-benzene are added, and the reaction mixture is heated up to 80–90° C. The dyestuff pigment rapidly dissolves and after a short time the initial violet-red coloration of the solution changes to brown. A test portion of the reaction mixture is then soluble in water to a clear solution. The reaction mixture is cooled to room temperature, and then stirred into a mixture of 150 parts of water and 21 parts of concentrated sulfuric acid, 10 parts of sodium chloride are added, and the whole is heated to 40–50° C., whereupon the reaction product precipitates well in the form of a resinous deposit. After pouring off the acid pyridine liquor, the residue is dissolved in 100 parts of water while heating to 40–50° C., by means of 5–10 parts of sodium chloride and it is again precipitated in a resinous form at 40–50° C., and the latter is separated from the salt solution and dried in vacuo at 40–50° C. The reaction product is a brown powder which dissolves easily in water to give a clear solution having a brown coloration, and is rapidly hydrolysed by means of dilute alkalis, especially ammonia, to the insoluble initial Bordeaux pigment. As starting material there is advantageously used the dry furane-2-carboxylic acid-5-sulfonic acid free from water of crystallisation and obtainable in the following manner:

Into a powerful kneading apparatus, which can be hermetically closed, are introduced 1121 parts of dry finely powdered furane-2-carboxylic acid and 1680 parts of methylene chloride which has been dried over sodium sulfate. The whole is thoroughly stirred for ½–1 hour, and then the mixture is cooled to 10–15° C. In the course of 3 hours 840 parts of sulfur trioxide are slowly introduced by distillation into the suspension of furane-2-carboxylic acid while continuously stirring, the temperature being maintained throughout between 10 and 15° C. The reaction mass becomes noticeably more fluid and acquires a dark brown color. When about 600–620 parts of sulfur trioxide have been introduced by distillation, the furane-2-carboxylic acid-5-sulfonic acid separates from the thinly liquid suspension in the form of a mass which becomes progressively more viscous, up to the end of the introduction of sulfur trioxide. The honey-like mass is stirred for a further 1–1½ hours while the temperature is maintained at 10–15° C. throughout. A slow crystallisation of furane-2-carboxylic acid-5-sulfonic acid can then be observed, and the crystals agglomerate to form large slag-like structures. After further stirring at 10–15° C., these slag-like structures are disintegrated and after stirring for ½–1 hour the furane-2-carboxylic acid-5-sulfonic acid is obtained in the form of a dark green finely pulverised suspension. The whole is filtered with suction, while excluding moisture, in order to remove methylene chloride, and the furane-2-carboxylic acid-5-sulfonic acid is completely dried in vacuo at room temperature. (The methylene chloride may also be removed by distillation in vacuo at room temperature.) Furane-2-carboxylic acid-5-sulfonic acid is obtained in quantitative yield (calculated on the initial furane-2-carboxylic acid) in the form of a pale olive-green powder which is free from water of crystallisation and is stable when stored with complete exclusion of moisture. It only becomes darker. The product decomposes very rapidly in the atmosphere.

Instead of methylene chloride, ethylene chloride may be used.

When the reaction is carried out at a temperature substantially higher than that given above, a more or less large quantity of a black decomposition product is obtained. At temperatures above 60–70° C. this black decomposition product is obtained exclusively.

Furane-2-carboxylic acid-5-sulfonic acid free from water of crystallisation can also be obtained in the following manner:

In a well closed flask fitted with a stirring mechanism, a reflux condenser, a thermometer and an inlet tube 124 parts of liquid sulfur trioxide are rapidly run into 200 parts of liquid sulfur dioxide while stirring and cooling to −20° C. 168 parts of well dried and finely pulverised furane-2-carboxylic acid are then introduced in small portions, while stirring continuously, the internal temperature never being allowed to exceed −12° C. The furane-2-carboxylic acid is rapidly sulfonated and passes into solution, the solution being initially yellow but later becoming brown. Towards the end the sulfonation becomes slower so that the furane-2-carboxylic acid added can still be observed after a short time. After all the furane-2-carboxylic acid has been added, the whole is stirred for a further ½–1 hour at −15° C.

The solution of furane-2-carboxylic acid-5-sulfonic acid is then introduced into a large vessel and the greater part of the sulfur dioxide is evaporated at room temperature. The remainder of the sulfur dioxide is almost completely evaporated under reduced pressure at room temperature. After drying overnight in vacuo at room temperature, the furane-2-carboxylic acid-5-sulfonic acid is obtained in quantitative yield in the form of a dark brown porous mass, which still occludes a very small proportion of sulfur dioxide which is difficult to remove completely.

*Example 4*

6.8 parts of the anhydrous disodium salt of furane-2-carboxylic acid-5-sulfonic acid are mixed with 30 parts by volume of dry pyridine, while stirring, 6.3 parts of para-toluene sulfochloride are added, and then 3.2 parts of the azo dyestuff from diazotised 1-aminonaphthalene and (2'-hydroxy-3'-naphthoylamino)-benzene are added. The reaction mixture is heated to 90–95° C. while stirring, and after the reaction has proceeded for ½ hour a test portion is soluble in water to give a clear solution. The acylation product is recovered in a manner corresponding to that described in Example 3, and the resulting brown reaction product is identical with the product of that example.

*Example 5*

18.6 parts of furane-2-carboxylic acid-5-sulfonate free from water of crystallisation

($C_5H_3O_6SNa$ prepared as described by Hill and Palmer, American Chemical Journal, vol. 10, page 373 [1888]) are mixed with 120 parts by volume of dry pyridine at 70–75° C., while stirring. 10 parts of the azo dyestuff from diazotised 3-chloro-1-aminobenzene and 1-(2'-hydroxy-3'-naphthoylamino)-2-methylbenzene are added, and 8.6 parts of phosgene are introduced in the course of 1½ hours in the form of a gaseous stream, the temperature being maintained throughout at 70–75° C. The red crystalline magma, consisting of the acid sodium salt of 5-sulfo-2-furanecarboxylic acid and the dyestuff pigment, becomes slowly darker, and both components slowly dissolve. After the addition of the phosgene the whole is maintained for a further 30–60 minutes at 70–75° C. until the pigment dyestuff has completely dissolved with a brown coloration, and a test portion of the reaction mixture is soluble in water to give a clear solution. After cooling to room temperature, the whole is stirred into a cold mixture of 450 parts of water and 63 parts of concentrated sulfuric acid. By the addition of 45 parts of sodium chloride the reaction product is salted out in the form of an oily mass which agglomerates upon heating to 40–45° C. so that, after cooling, the sulfuric acid-pyridine liquor can be separated satisfactorily. The reaction product is dissolved with 500 parts of water and 7 parts by volume of acetic acid of 10 per cent. strength and is again salted out with 70 parts of sodium chloride. After being dried at 40–50° C. in vacuo, the reaction product is an orange-brown powder which dissolves easily in water to give a clear solution having an orange-brown coloration, and after the addition of a dilute alkali immediately hydrolyses to the insoluble initial pigment.

Example 6

19.2 parts of furane-2-carboxylic acid-5-sulfonic acid are dissolved in 90 parts by volume of dry pyridine, while stirring, and 18.6 parts of the azo dyestuff from diazotized 2:5-dichloro-1-amino-benzene and 1-(2'-hydroxy-3'-naphthoylamino)-2-methoxy-benzene are added. 11.9 parts of phosgene are then introduced into the mixture at 30–40° C. in the course of about 2 hours, and then the mixture is heated to 90–95° C. After a short period of reaction (about ¼ hour) the dyestuff pigment dissolves, and a test portion of the reaction mixture dissolves in water to give a clear solution. The reaction mixture is cooled to room temperature, and stirred into a mixture of 350 parts of water and 40 parts of concentrated sulfuric acid. 25 parts of sodium chloride are added and the whole is heated to 40–50° C., whereupon the reaction product separates well in the form of a resinous deposit. After pouring off the acid pyridine liquor, the residue is dissolved in 400 parts of water while heating to 40–50° C. and the salt liquor is removed. After redissolution in water and salting out with sodium chloride the reaction product is dried in vacuo at 40–50° C. It is an orange-brown to red-brown powder, which dissolves easily in water to give a clear solution having an orange-brown coloration, and which rapidly separates upon hydrolysis with a dilute alkali in the form of the insoluble initial pigment.

The same reaction product can also be obtained by using, instead of phosgene, 20.8 parts of para-toluene sulfochloride. The reaction can also be carried out with the same success by adding the insoluble azo dyestuff only after the addition of the para-toluene sulfochloride or the phosgene, and then raising the mixture to the reaction temperature. Finally, it is also possible to introduce the phosgene at a reaction temperature of 70–75° C. into the reaction mixture consisting of a mixture of furane-2-carboxylic acid-5-sulfonic acid and the pigment in pyridine, the acylation also following the complete introduction of phosgene.

Example 7

10.4 parts of thiophene-2-carboxylic acid-5-sulfonic acid are dissolved in 60 parts by volume of dry pyridine, while stirring, and 7.75 parts of the azo dyestuff from diazotized 2:5-dichloro-1-aminobenzene and 1-(2'-hydroxy-3'-naphthoylamino)-2-methoxybenzene are added. 6 parts of phosgene are then introduced into the reaction mixture at 30–40° C. in the course of 1–1½ hours, and then the mixture is heated to 90–95° C. After a reaction period of about ¼ hour the pigment dissolves, and a test portion of the reaction mixture is soluble in water to give a clear solution. The reaction mixture cooled to room temperature is then stirred into a mixture of 250 parts of water and 25 parts of concentrated sulfuric acid, 15 parts of sodium chloride are added, and the whole is heated to 40–50° C., whereupon the reaction product separates well in the form of a resinous deposit. After pouring off the acid pyridine liquor, the residue is dissolved in 200 parts of water at 40–50° C., while stirring, and is again separated in resinous form by means of 15 parts of sodium chloride at 40–50° C. The salt solution is separated, and the reaction product is then dried in vacuo at 40–50° C. It is an orange-brown product which dissolves easily in water to give a clear solution, and again yields the initial insoluble pigment by hydrolysis with a dilute alkali.

Example 8

6 parts of furane-2-carboxylic acid-5-sulfonic acid are mixed with 40 parts by volume of dry benzene and 16 parts of triethylamine are added. 6.5 parts of para-toluene sulfochloride and then 1 part of the azo dyestuff from diazotised 1-aminonaphthalene and (2'-hydroxy-3'-naphthoylamino)-benzene are added to the reaction mixture. The latter is then heated to the boil, whereupon the bordeaux initial pigment slowly dissolves and a brown oily reaction product is obtained, which deposits on the walls of the vessel. After pouring off the benzene solution, the reaction product is taken up with water and salted out with sodium chloride. After being dried in vacuo, the reaction product is a brown powder which dissolves easily in water to give a clear solution having a brown coloration, and is rapidly hydrolysed by means of a dilute alkali to the insoluble bordeaux initial pigment.

Example 9

7.7 parts of furane-2-carboxylic acid-5-sulfonic acid are dissolved in 50 parts by volume of dry pyridine, while stirring, and 5.1 parts of the azo dyestuff from diazotised 4-chloro-2-methyl-1-aminobenzene and 3:2-hydroxydiphenylene oxide carboxylic acid-2':5'-dimethoxy anilide are added. 8.3 parts of para-toluene sulfochloride are then added to the reaction mixture, and the latter is heated to 70–75° C. while stirring. After a reaction period of a few minutes the dark brown initial pigment dissolves, and a test portion of the reaction mixture dissolves in water to give a clear solution. The reaction mixture is cooled to room temperature and stirred into a mixture of 200 parts of water and 23 parts of concentrated sulfuric acid, 15 parts of sodium chloride are added, and the whole is heated to 40–50° C., whereupon the reaction product separates well in the form of a resinous deposit. After pouring off the acid pyridine liquor, the residue is dissolved in 150 parts of water while heating to 40–50° C., the reaction product is salted out with 15 parts of sodium chloride at 40–50° C., the salt liquor is separated, and the reaction product is dried at 40–50° C. in vacuo. The reaction product is an orange-brown powder which dissolves easily in water to form a clear orange solution and is again separated by hydrolysis with a dilute alkali in the form of the insoluble black-brown initial pigment.

Example 10

17.2 parts of furane-2-carboxylic acid-5-sulfonic acid are dissolved in 120 parts by volume of dry pyridine, while stirring and 11.5 parts of the azo dyestuff from diazotised 4-benzoylamino-2:5-diethoxy-1-aminobenzene and (2'-hydroxy-3'-naphthoylamino)-benzene are added. 10.7 parts of phosgene are then introduced into the mixture at 30–40° C. in the course of about 1½ hours, and then the whole is heated to 90–95° C. After a reaction period of about 2 hours the initial blue pigment will have passed into solution and a test portion of the reaction mixture will be soluble in water to give a clear solution having a brown coloration. The reaction mixture is cooled to room temperature and stirred into a mixture of 450 parts of water and 63 parts of concentrated sulfuric acid, 30 parts of sodium chloride are added and the whole is heated to 40–50° C., whereupon the reaction product precipitates well in the form of a resinous deposit. The acid pyridine liquor is poured off and the residue is dissolved in 400 parts of water while heating to 40–50% C. The resinous material is again precipitated by the addition of 60 parts of sodium chloride at 40–50° C., and the material is dried in vacuo at 40–50° C. after separating the salt liquor. The reaction product is a brown powder which dissolves easily in water to give a clear solution having a brown coloration, and rapidly precipitates in the form of the insoluble initial blue pigment upon hydrolysis with a dilute alkali, for example, ammonia.

*Example 11*

4.8 parts of furane-2-carboxylic acid-5-sulfonic acid are dissolved in 40 parts by volume of dry pyridine, while stirring, and 36 parts of the azo dyestuff from diazotised 4-benzoylamino-2:5-diethoxy-1-aminobenzene and (2'-hydroxy-3'-naphthoylamino)-benzene are added. 5.2 parts of para-toluene sulfochloride and then 11.6 parts of triethylamine are added to the reaction mixture. The latter is then heated to 90–95° C. while stirring, the acylation taking place after a short reaction period (15 minutes) and a test portion of the reaction mixture becoming soluble in water to give a clear solution. The product obtained by salting out from aqueous solution by means of sodium chloride (as described in Example 10) is identical with the product of Example 10.

*Example 12*

13 parts of the anhydrous disodium salt of 5-chlorofurane-2-carboxylic acid-3-sulfonic acid (prepared as described by Hill and Hendrixson, American Chemical Journal, vol. 15, page 151 [1893]) are mixed with 60 parts by volume of dry pyridine while stirring, 9.2 parts of para-toluene sulfochloride are added, and then 5.0 parts of the azo dyestuff from diazotised 3-chloro-1-aminobenzene and 1-(2'-hydroxy-3'-naphthoylamino)-2-methylbenzene are introduced. The reaction mixture is heated to 75–80° C. while stirring, and after ½ hour a test portion is soluble in water to give a clear solution. The reaction mixture is cooled to room temperature, then stirred into a mixture of 250 parts of water and 32 parts of concentrated sulfuric acid, 30 parts of sodium chloride are added, and the whole is heated to 40–50° C., whereupon the reaction product separates well in the form of a resinous deposit. After pouring off the acid pyridine liquor, the residue is dissolved in 250 parts of water while heating at 40–50° C., the product is salted out with 30 parts of sodium chloride at 40–50° C., the salt solution is separated, and the reaction product is dried in vacuo at 40–50° C. The orange-brown product, which is soluble in water to give a clear solution, yields the initial insoluble pigment upon hydrolysis with dilute alkalis.

*Example 13*

15 parts of the anhydrous disodium salt of 5-bromofurane-2-carboxylic acid-3-sulfonic acid (prepared as described by Hill and Palmer, American Chemical Journal, vol. 10, page 409 [1888]) are mixed with 60 parts by volume of dry pyridine while stirring, 12 parts of para-toluene sulfochloride are added, and then 5 parts of the azo dyestuff from diazotised 3-chloro-1-aminobenzene and 1-(2'-hydroxy-3'-naphthoylamino)-2-methylbenzene are introduced. The reaction mixture is heated to 70–75° C. while stirring, and after ¼ hour a test portion is soluble in water to give a clear solution. The reaction mixture is cooled to room temperature and worked up in exactly the same manner as is described in Example 12. The orange-brown product, which dissolves in water to give a clear solution, yields the initial insoluble pigment upon hydrolysis with dilute alkalis.

*Example 14*

22.6 parts of the anhydrous disodium salt of furane-2-carboxylic acid-3-sulfonic acid [prepared as described by Hill and Palmer, Proceedings of the American Academy, vol. 23, page 214 (1888)] are mixed with 120 parts by volume of dry pyridine while stirring, 18.4 parts of para-toluene sulfochloride are added, and then 10.0 parts of the azo dyestuff from 3-chloro-1-aminobenzene and 1-(2'-hydroxy-3'-naphthoylamino)-2-methylbenzene are introduced. The reaction mixture is heated to 75–80° C. while stirring in 40–80 minutes, and then refluxed for a short time in an oily bath. A test portion will then be soluble in water. The reaction mixture is cooled to room temperature, and stirred into a mixture of 450 parts of water and 63 parts of concentrated sulfuric acid, 60 parts of sodium chloride are added, and the whole is heated to 40–50° C., whereupon the reaction product separates well in the form of a resinous deposit. After pouring off the liquor containing sulfuric acid and pyridine sulfate, the residue is dissolved in 500 parts of water while heating at 40–50° C., filtered with suction, salted out with 60 parts of sodium chloride at 40–50° C., the salt solution is separated, and the reaction product is then dried in vacuo at 40–50° C. The orange-brown water-soluble reaction product yields the initial insoluble pigment upon hydrolysis with dilute alkalis.

*Example 15*

29.3 parts of the anhydrous disodium salt of 3:4-dichlorofurane-2-carboxylic acid-5-sulfonic acid [prepared as described by Hill and Hendrixson, American Chemical Journal, vol. 15, page 149 (1893)] are mixed with 120 parts by volume of dry pyridine while stirring, 22.6 parts of para-toluene sulfochloride are added, and then 10.0 parts of the azo dyestuff from diazotised 3-chloro-1-aminobenzene and 1-(2'-hydroxy-3'-naphthoylamino)-2-methylbenzene are introduced. The reaction mixture is heated at 75–80° C. for 40–80 minutes while stirring, and then refluxed for a short time in an oily bath. A test portion is then soluble in water. The reaction mixture is cooled to room temperature, stirred into a mixture of 450 parts of water and 63 parts of concentrated sulfuric acid, 60 parts of sodium chloride are added, and the whole is heated to 40–50° C., whereupon the reaction product separates in the form of a resinous deposit. After pouring off the liquor containing sulfuric acid and pyridine sulfate, the residue is dissolved in 500 parts of water while heating at 40–50° C., filtered with suction, salted out with 60 parts of sodium chloride at 40–50° C., the salt solution is separated, and the reaction product is then dried in vacuo at 40–50° C. The orange-brown water-soluble reaction product yields the initial insoluble pigment upon hydrolysis with dilute alkalis.

*Example 16*

4 parts of furane-2-carboxylic acid-5-sulfonic acid are dissolved in 40 parts of dry pyridine and 5.7 parts of para-toluene sulfobromide are added. 2 parts of the azo dyestuff from diazotised 3- chloro-1-aminobenzene and 1-(2'-hydroxy-3'-naphthoylamino)-2-methylbenzene are added to the reaction mixture, and the latter is then heated to 90–95° C. while stirring. After about ¼ hour, the pigment will have dissolved in the reaction mixture and a test portion of the dark yellow-brown solution will be soluble in water to give a clear solution. The reaction mixture is cooled to room temperature and introduced into dilute sulfuric acid, and completely precipitated by the addition of sodium chloride. After separating the liquor containing sulfuric acid and pyridine sulfate, and drying in vacuo at 40–50° C., the reaction product is obtained in the form of an orange-brown powder which dissolves in water to give a clear solution having an orange-brown coloration, and can be hydrolysed rapidly with dilute alkalis to yield the initial insoluble pigment.

What we claim is:

1. Process for the manufacture of an acylating agent which comprises reacting an acid of the formula

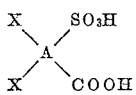

in which A represents a five-membered heterocyclic ring consisting of 4 carbon atoms bound together by conjugate double bonds and one atom selected from the group consisting of oxygen and sulfur and each X represents a member selected from the group consisting of hydrogen and halogen atoms, each —X, —SO₃H and —COOH substituent being directly connected to a carbon atom of the said ring, in the presence of an excess of a tertiary base with a member of the group consisting of aromatic sulfonic acid halides and phosgene.

2. Process for the manufacture of an acylating agent which comprises reacting an acid of the formula

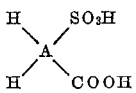

in which A represents a five-membered heterocyclic ring consisting of 4 carbon atoms bound together by conjugate double bonds and one oxygen atom, each of the —H, —SO₃H and —COOH substituents being directly connected to a carbon atom of the said ring in the presence of an excess of a tertiary base with an aromatic sulfonic acid chloride.

3. Process for the manufacture of an acylating agent which comprises reacting an acid of the formula

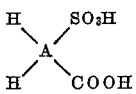

in which A represents a five-membered heterocyclic ring consisting of 4 carbon atoms bound together by conjugate double bonds and one oxygen atom, each of the —H, —SO₃H and —COOH substituents being directly connected to a carbon atom of the said ring in the presence of an excess of a tertiary base with phosgene.

4. Process for the manufacture of an acylating agent which comprises reacting an acid of the formula

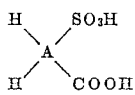

in which A represents a five-membered heterocyclic ring consisting of 4 carbon atoms bound together by conjugate double bonds and one oxygen atom, each of the —H, —SO₃H and —COOH substituents being directly connected to a carbon atom of the said ring in the presence of an excess of pyridine with an aromatic sulfonic acid chloride.

5. Process for the manufacture of an acylating agent which comprises reacting an acid of the formula

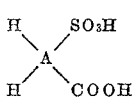

in which A represents a five-membered heterocyclic ring consisting of 4 carbon atoms bound together by conjugate double bonds and one oxygen atom, each of the —H, —SO₃H and —COOH substituents being directly connected to a carbon atom of the said ring in the presence of an excess of pyridine with phosgene.

6. Process for the manufacture of an acylating agent which comprises reacting the acid of the formula

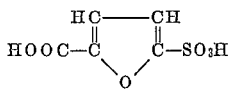

in the presence of an excess of pyridine and triethylamine, with phosgene.

7. Process for the manufacture of an acylating agent which comprises reacting the acid of the formula

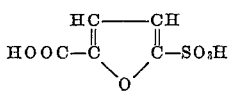

in the presence of an excess of pyridine and triethylamine, with an aromatic sulfonic acid chloride.

CHARLES GRAENACHER.
ADOLF EMIL SIEGRIST.
HEINRICH BRUENGGER.

REFERENCES CITED

The following references are of record in the file of this patent:

UNITED STATES PATENTS

| Number | Name | Date |
|---|---|---|
| 1,932,180 | Guenther et al. | Oct. 24, 1933 |

FOREIGN PATENTS

| Number | Country | Date |
|---|---|---|
| 401,643 | Great Britain | Feb. 12, 1932 |

OTHER REFERENCES

Beilstein: Handbuch der Organischen Chemie, ed. 4, vol. 18, p. 581, Springer, Berlin, 1934.